United States Patent [19]
Iwasaki

[11] Patent Number: 6,152,603
[45] Date of Patent: Nov. 28, 2000

[54] BEARING DEVICE

[75] Inventor: Kastuhiro Iwasaki, Namerikawa, Japan

[73] Assignee: Sansho Giken Co., Ltd., Toyama, Japan

[21] Appl. No.: 09/112,232

[22] Filed: Jul. 9, 1998

[30] Foreign Application Priority Data

Jul. 10, 1997 [JP] Japan .................................. 9-185275
Mar. 27, 1998 [JP] Japan .................................. 10-081748

[51] Int. Cl.$^7$ ................................................. F16C 17/02
[52] U.S. Cl. ........................................ 384/428; 384/441
[58] Field of Search .................................. 384/428, 438, 384/441, 537, 584

[56] References Cited

U.S. PATENT DOCUMENTS 4,591,276 5/1986 Schneider et al. ...................... 384/206

FOREIGN PATENT DOCUMENTS 8284965 11/1996 Japan .

Primary Examiner—Lenard A. Footland
Attorney, Agent, or Firm—Pollock, Vande Sande & Amernick

[57] ABSTRACT

A bearing device is presented, by which it is possible to rotate a rotation shaft of a motor smoothly at a constant speed without impairing its characteristics even when a load is applied on the rotation shaft from a given direction as when the device is incorporated in video equipment. The bearing device includes a holder designed in a cylindrical shape, a collar unit extending in a peripheral direction near a first end in an axial direction of the holder, fixing units and mounting units alternately arranged along the circumference of an outer peripheral portion of the collar unit. Also included are engaging sectors of bearing bodies on each of a first end and a second end of a bearing bore of the holder. An annular groove formed in the axial direction from the first end is provided on an outer periphery of the holder so that the thickness of the peripheral wall forming the engaging unit on the first end of the holder will be uniform over the entire periphery.

3 Claims, 6 Drawing Sheets

BEARING DEVICE

BACKGROUND OF THE INVENTION

1. Field of the Invention

The present invention relates to a bearing device of a motor to be incorporated in a device such as a video equipment.

2. Description of the Prior Art

A video tape recorder is generally used as a video equipment, and a motor for rotating video tape at a predetermined speed is incorporated in the video tape recorder. An example of a bearing device for the motor is shown in FIG. 7 as it is disclosed in JP-A-8-284965. Under a holder 31, a collar unit 32 is protrudes. On the outer periphery of the collar unit 32, fixing units 38 and mounting units 39 are arranged alternately with equal spacing. In engaging sectors 34a and 34b provided on the upper portion and lower portion of the holder 31 respectively, bearing bodies 33a and 33b are engaged, and these are unremovably held by presser washers 35a and 35b. In particular, dimension with high precision are required for the engaging sectors 34a and 34b, and the bearing device is usually produced by die-cast molding from various types of alloys such as aluminum, zinc, magnesium, etc.

In the product produced by die-cast molding, solidifying time varies when thickness is not uniform, and it is known that a slight recess (also called "recess mark") is likely to occur on a thicker portion. For this reason, on the engaging unit on the upper portion of the holder, thickness of the peripheral wall is uniform and recess does not occur almost at all, and it is possible to maintain circularity (difference of maximum value and minimum value of inner diameter) within 6 $\mu$m. On the other hand, as shown in FIG. 8, on the lower portion of the holder 31, there are provided reinforcing pieces 42 directed toward mounting units 39 and also reinforcing ribs 43 reaching fixing units 38 in radial direction, and thickness of the peripheral wall of the engaging unit 34b on the lower portion becomes uneven. Thus, recesses 49 are likely to occur on the engaging unit 34b as shown in FIG. 9.

When there are recesses on the engaging unit, gap is generated between the engaging unit and the bearing bodies. When oil is supplied to the bearing bodies (oil-impregnated metal), oil tends to enter the recesses, and this reduces the quantity of oil to enter between motor rotation shaft and the engaging unit to smoothen the rotation and also decreases supporting ability of the bearing bodies. In particular, the recesses may cause slightly eccentric rotation of the rotation shaft of the motor, and this may cause errors in video tape feeding speed.

To solve the above problems, it is an object of the present invention to provide a bearing device, by which it is possible to rotate a rotation shaft of a motor smoothly at a constant speed without impairing the problem characteristics even when load is applied on the rotation shaft of the motor when the device is incorporated in a video equipment.

According to claim 1 the present invention, a bearing device is provided, which comprises a holder designed in cylindrical shape, a collar unit extending in outer peripheral direction near a first end in axial direction of the holder, fixing units and mounting units alternately arranged along the circumference of outer periphery of the collar unit, and engaging sectors of bearing bodies on each of the first end and a second end on the other end of a bearing bore of the holder, whereby an annular groove formed in the axial direction from the first end of the holder is provided so that thickness of the peripheral wall forming the engaging unit of the bearing bodies of the holder is even over the entire periphery. Here, the first end of the holder means an end closer to the mounting side of the holder, and the second end means an end opposite to the mounting side.

The invention, the annular groove reaches the designed depth of the engaging unit from the bottom surface of the collar unit. Reaching the designed depth of the engaging sector means that it may enter slightly deeper in the axial direction than the depth surface of the engaging unit or it may agree with the depth surface or may be slightly shallower.

In the device according to the invention, a reinforcing unit to support the peripheral wall of the engaging unit may be provided in the annular groove. Axial length of the reinforcing unit may agree with groove depth of the annular groove or may be slightly shallower or may reach the first end of the-holder.

In the device according to the present invention, the difference between maximum value and minimum value of inner diameter of the peripheral wall of the engaging unit on the first end of the holder is not more than 6 $\mu$m.

BRIEF DESCRIPTION OF THE DRAWINGS

These and other objects and features of the present invention will become more readily apparent from the following detailed description taken in conjunction with the accompanying drawings in which.

DETAILED DESCRIPTION OF THE PREFERRED EMBODIMENTS

Figure 1:
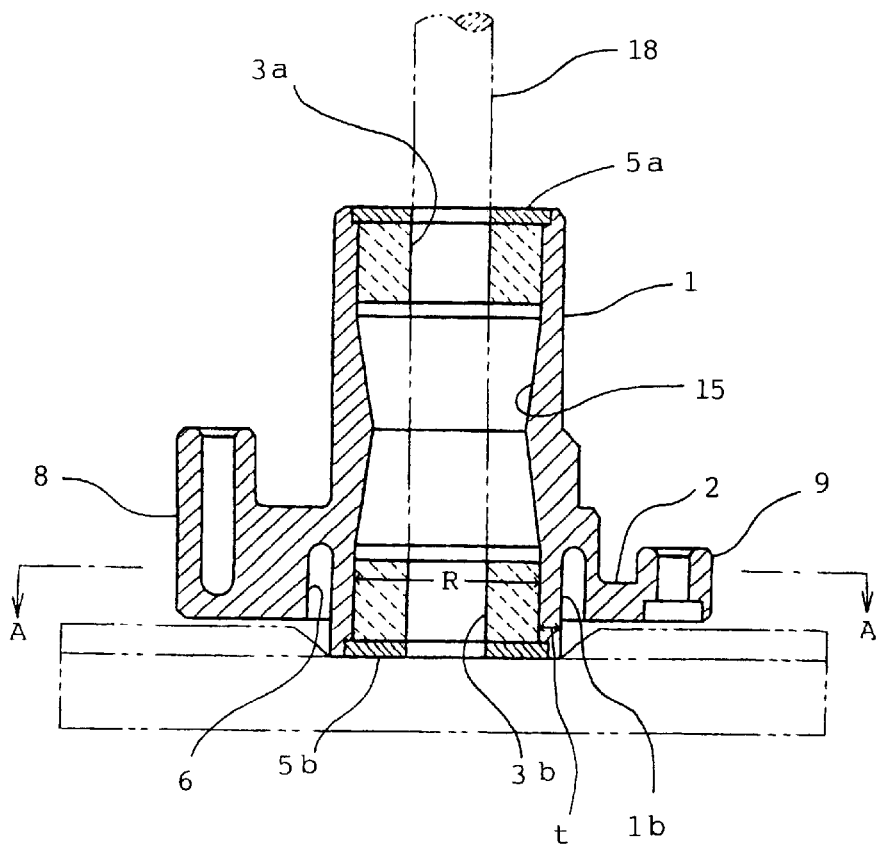
FIG. 1 is a longitudinal sectional view of a bearing device according to the present invention.
Figure 2:
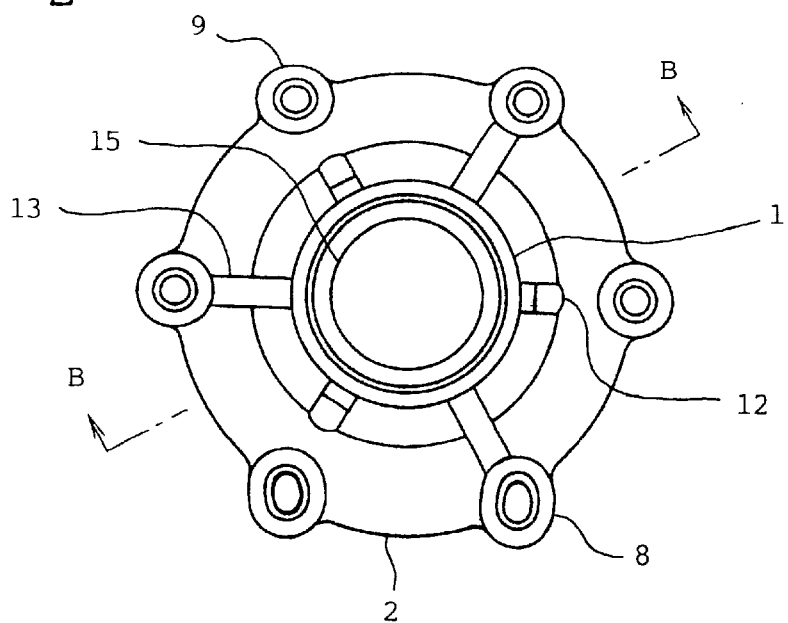
FIG. 2 is a plan view of a bearing device according to the present invention.

In the following, description will be given on a first embodiment of a bearing device according to the present invention referring to FIG. 1. In this bearing device, a collar unit 2 protrudes in an outer peripheral direction from a first end of a holder 1, and fixing units 8 and mounting units 9 are alternately arranged on outer periphery of the collar unit 2. On a first end and a second end of a bearing bore 15, which penetrates the holder, there are provided engaging units 4a and 4b of bearing bodies 3a and 3b, and an annular groove 6 formed in axial direction from the first the outer peripheral portion of a peripheral wall 1b of the engaging sector 4b is provided in such manner that the thickness "t" of the peripheral wall of the engaging sector 4b will be uniform over the entire periphery.

Figure 3:
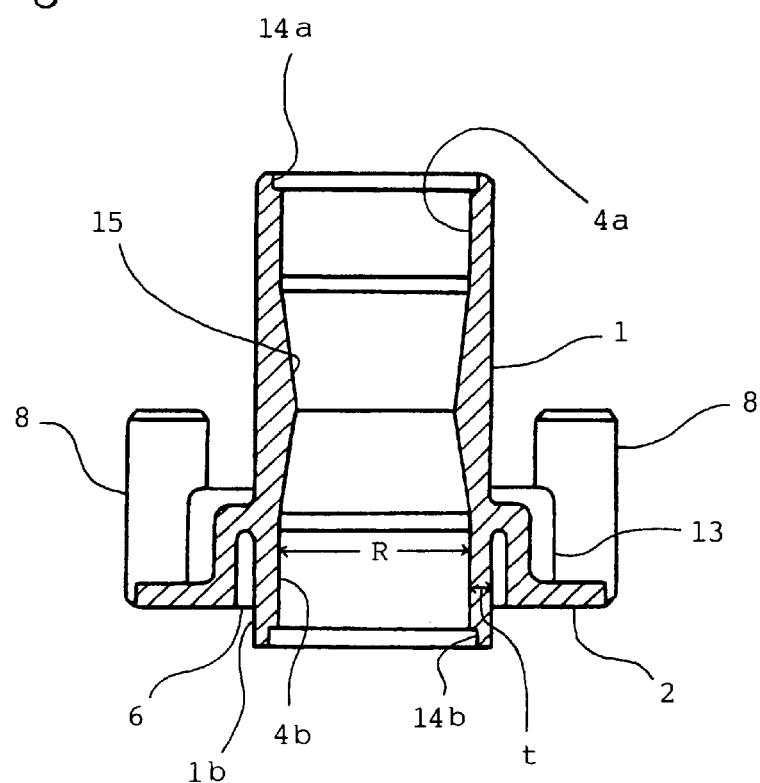
FIG. 3 is a cross-sectional view along the line B—B in FIG. 2.

As shown in FIG. 3, in the holder 1, there are recesses 14a and 14b on presser washers 5a and 5b on the forward end of each of the engaging sectors 4a and 4b. Because the first end of the holder 1 serves as a mounting side, the presser washer 5b may not be provided. On the outer periphery of the collar unit 2, a plurality of fixing units 8 and mounting units 9 are arranged alternately with equal spacing. On the collar unit 2, a reinforcing piece 12 leading toward each of the mounting units 9 from the holder 1 and a reinforcing rib 13 reaching each of the fixing units 8 from the holder 1 protrude respectively in the radial direction.

Figure 4:
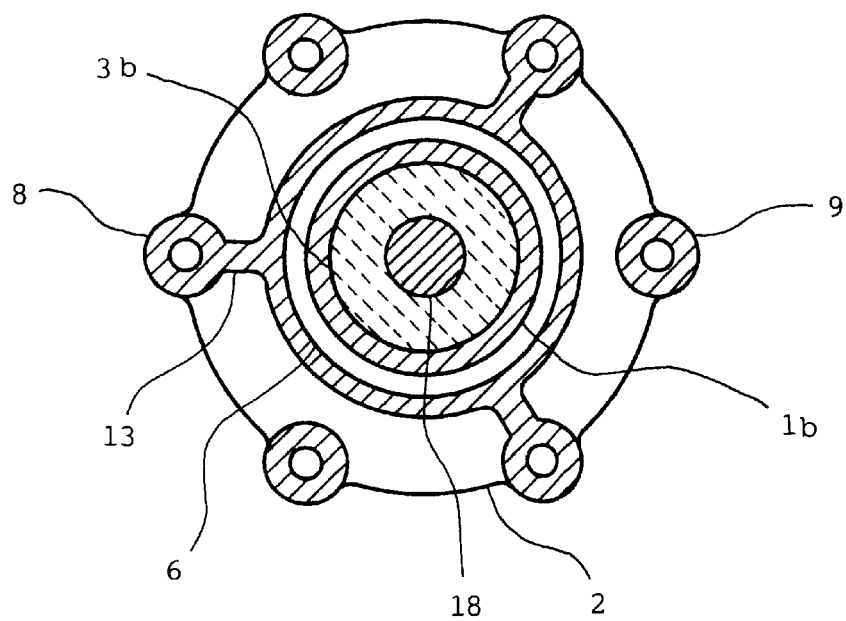
FIG. 4 is a cross-sectional view along the line A—A in FIG. 1.

At the bottom surface of the collar unit 2, as shown in FIG. 3 and FIG. 4, an annular groove 6 formed in the axial direction is arranged over the entire periphery so that thickness "t" of the peripheral wall of the engaging sector 4b will be even. It is designed in such manner that groove depth of the annular groove 6 agrees with the designed range of the engaging sector 4b or that it is deeper than the designed range or that it is shallower by the thickness "t" of the peripheral wall.

Figure 5:
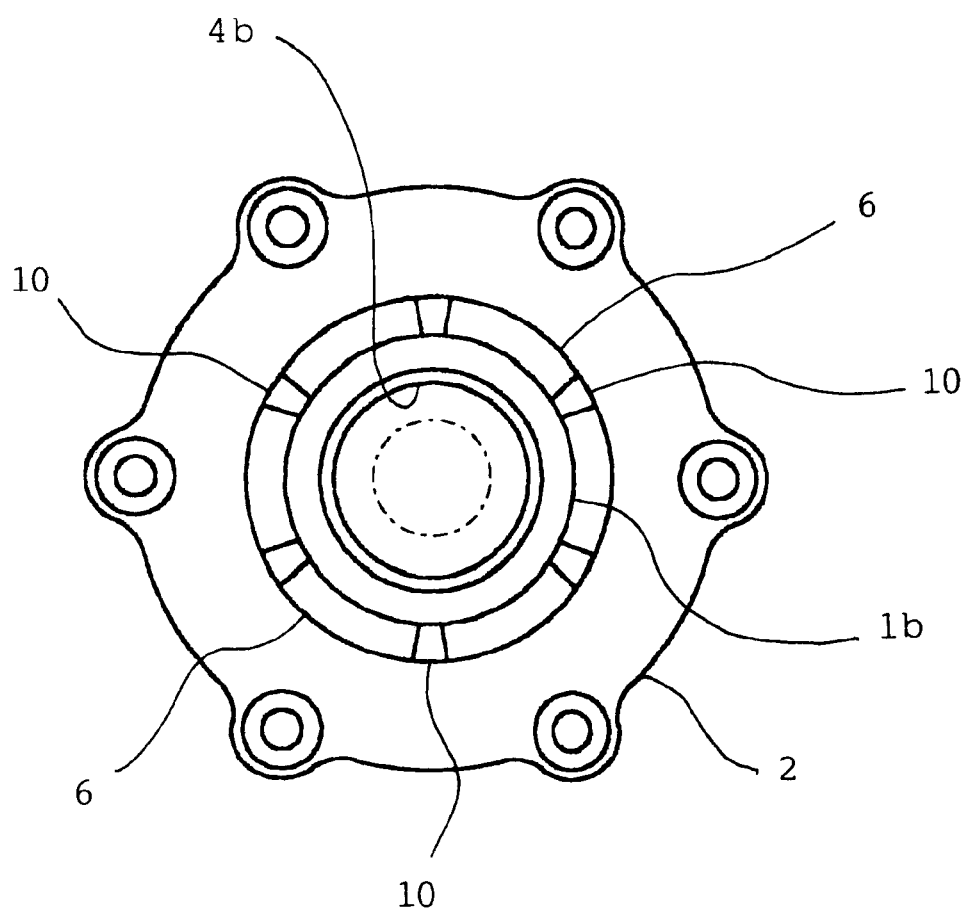
FIG. 5 is a bottom view showing another embodiment of a bearing device according to the present invention.

Description is now given on the bearing device according to 3 of FIG. 5. On the bearing device where the engaging sector 4b is formed in a wider range, and depth of the annular groove 6 is designed deeper, peripheral wall 1b of the engaging sector 4b may vibrate due to rotation of a rotation shaft 18 of a motor. For this reason, reinforcing units 10 to support the peripheral wall 1b of the engaging sector 4b are arranged in the annular groove 6 so that the peripheral wall 1b can be stably supported.

The reinforcing units 10 run in parallel to the axial direction of the peripheral wall 1b of the engaging sector 4b and are preferably disposed at 3 points or more with equal spacing. It is preferable that there are as fewer junctions as possible between the reinforcing units 10 and the peripheral wall 1b. This is to maintain the thickness "t" of the peripheral wall of the engaging unit 4b as uniform as possible.

Figure 6A:
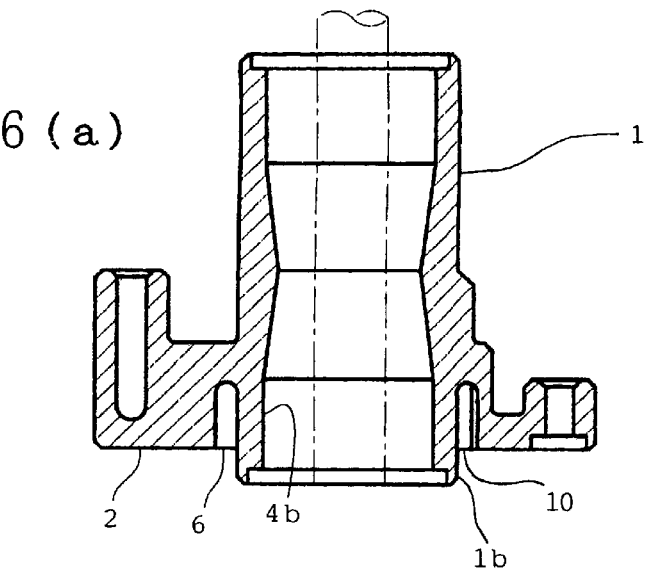
FIGS. 6 (a), 6(b) and 6(c) each represents a longitudinal sectional view of a bearing device, which shows an example of a reinforced unit according to the present invention.
Figure 6B:
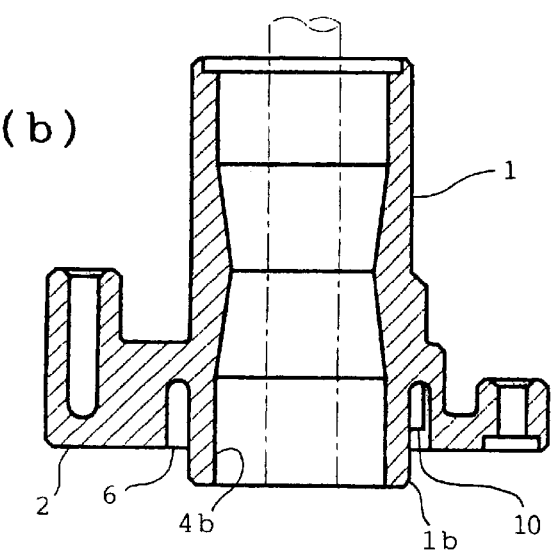
Figure 6C:
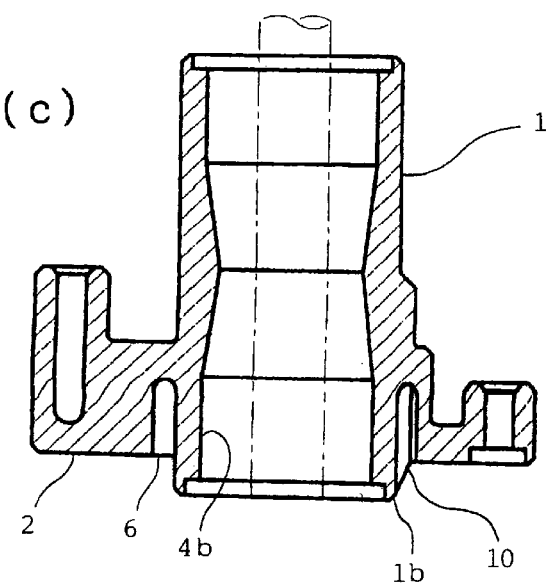
Figure 7:
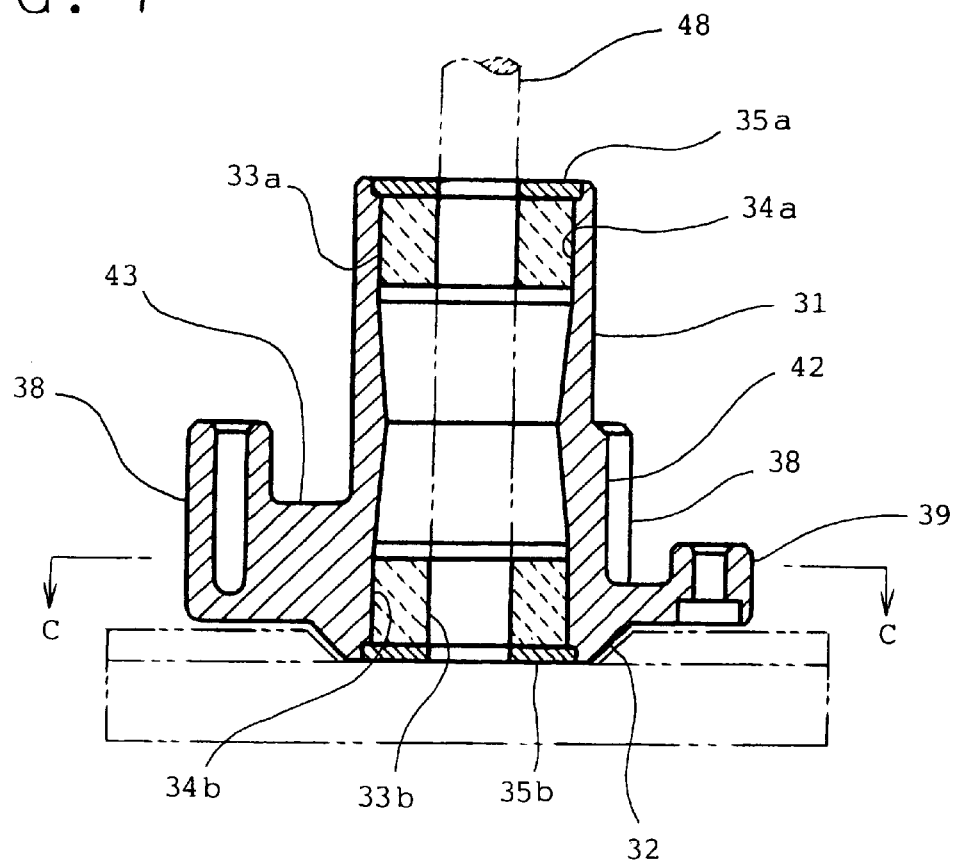
FIG. 7 is a longitudinal sectional view of a conventional type bearing device.
Figure 8:
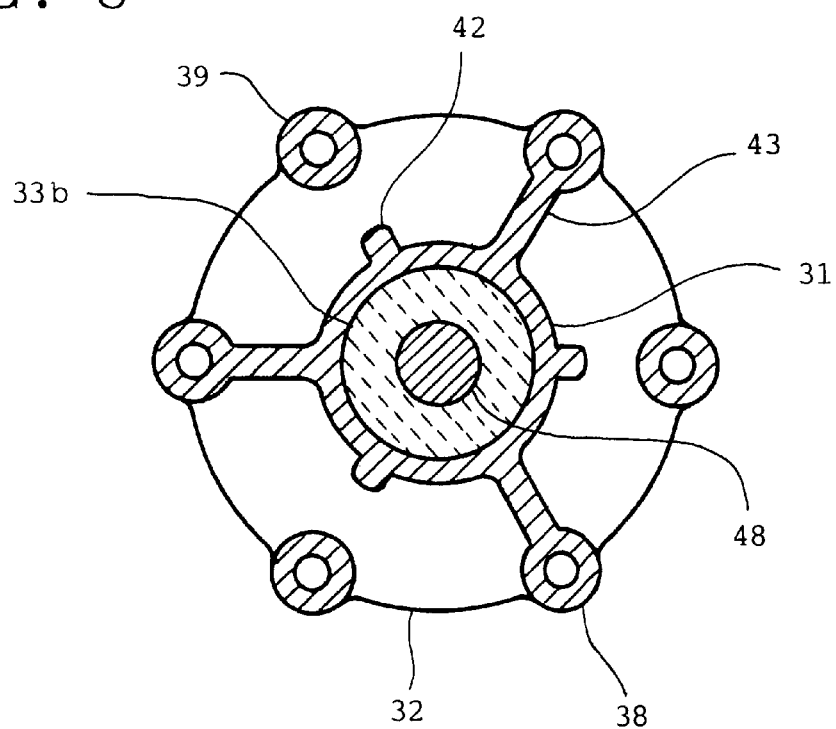
FIG. 8 is a cross-sectional view along the line C—C in FIG. 7.
Figure 9:
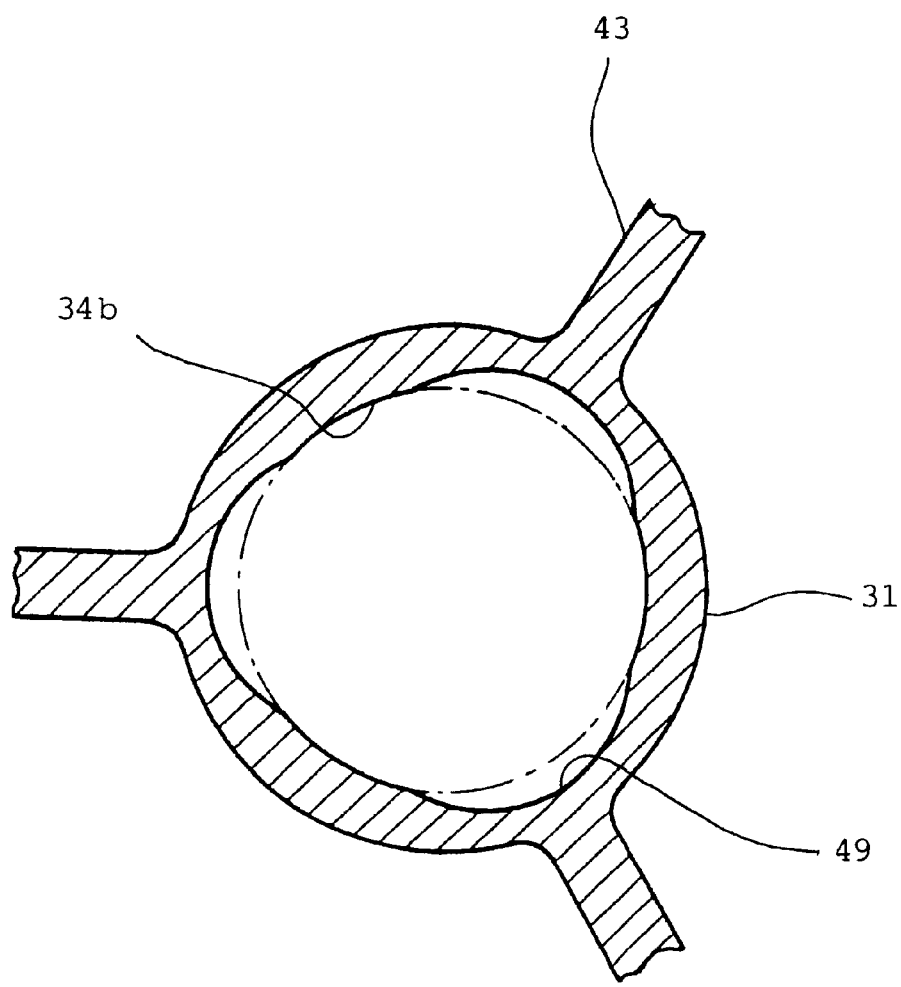
FIG. 9 is an enlarged cross-sectional view of an essential portion showing recesses on the engaging sector.

In the bearing device shown in FIG. 6 (a), the reinforcing unit 10 extends in the same length as the groove depth of the annular groove 6. In particular, in case the peripheral wall 1b of the engaging unit 4b aligns with the bottom surface of the collar unit 2 or in case it is slightly protrudes downward in the axial direction, the reinforcing unit 10 aligns with the designed range of the peripheral wall 1b of the engaging unit 4b, and this makes it possible to stably support the peripheral wall 1b.

In the bearing device shown in FIG. 6 (b), the axial length of the reinforcing unit 10 is designed slightly shorter than the groove depth of the annular groove 6. Accordingly, the junction between the reinforcing unit 10 and the peripheral wall 1b is reduced, and this makes it possible to maintain the thickness "t" of the peripheral wall of the engaging sector 4b as uniform as possible, and to have the bearing device of lightweight design produced at lower cost as the reinforcing unit 10 is designed shorter.

In the bearing device shown in FIG. 6 (c), the reinforcing unit 10 is provided up to the tip of the peripheral wall 1b even when the peripheral wall 1b of the engaging unit 4b protrudes downward in the axial direction from the bottom surface of the collar unit 2, and this makes it possible to firmly support the peripheral wall 1b.

The bearing device according to the present invention is not limited to the product manufactured by die-cast molding of alloy as described above but it may be produced by molding of synthetic resin, and there is no restriction on the material. Further, the bearing device of the present invention can be used in such applications as a recording and reproducing apparatus using cassette tape or disk in addition to a video equipment.

In the bearing device according to the present invention, the annular groove is provided on an outer periphery of a first end of the holder. As a result, thickness of the peripheral wall of the engaging sector is uniform, and no recess occurs on the engaging sector. As a result, when oil is supplied to the bearing bodies, oil does not enter into gap caused by the recess, and oil can be efficiently utilized. Because the annular groove is provided on outer periphery of the engaging sector, the outer area of the holder is increased, and this will be helpful in radiating the heat generated by friction due to rotation of the motor.

According to the invention, the annular groove is provided over almost the entire range of the depth of the engaging unit. This makes it possible to have uniform thickness of the peripheral wall and to reduce the possibility to form a recess on the engaging unit. Thus, it is possible to provide a bearing device with high precision, which has the engaging sector with better circularity.

According to the present invention, the reinforcing unit is arranged in the annular groove. Even when the groove is designed deeper, it is possible to stably support the peripheral wall of the engaging unit from the collar unit, and this will eliminate vibration even when rotation shaft of the motor is rotated during operation.

According to the invention the engaging sector is designed with a diameter that is not more than 6 μm. This makes it possible to prevent the bearing bodies from being vibrated and to support the rotation shaft of the motor in such manner that it is not rotated eccentrically.

What is claimed is:

1. A bearing device, comprising: a holder designed in a cylindrical shape, a collar unit extending in a peripheral direction near a first axial end of the holder, fixing units and mounting units alternately arranged along a circumference of an outer peripheral portion of the collar unit, and engaging sectors of bearing bodies on each of a first end and a second end of a bearing bore of the holder, whereby an annular groove is formed in an axial direction from the first end and is provided on an outer periphery of the holder so that a thickness of a peripheral wall forming the engaging sector on the first end of the holder will be uniform over the entire periphery of the first end of the holder;

wherein a difference between maximum value and minimum value of the inner diameter of the peripheral wall of the engaging sector provided on the first end of the holder is not more than 6 μm.

2. A bearing device according to claim 1, and further wherein the annular groove has a depth approaching the depth of the engaging sector measured from a bottom surface of the collar unit.

3. A bearing device according to claim 1, together with a reinforcing unit, to support the periperal wall of the engaging sector and provided in the annular groove.

* * * * *